United States Patent [19]

Schimmelpenniñk et al.

[11] Patent Number: 4,524,288

[45] Date of Patent: Jun. 18, 1985

[54] SYSTEM FOR POWER SUPPLY TO AND SWITCHING OF A NUMBER OF ELECTRICAL APPLIANCES

[75] Inventors: Laurens M. H. Schimmelpennink, Amsterdam; Lambertus Spaanenburg, Hengelo, both of Netherlands

[73] Assignee: Moban B.V., Simpelveld, Netherlands

[21] Appl. No.: 482,482

[22] Filed: Apr. 6, 1983

[30] Foreign Application Priority Data

Apr. 7, 1982 [NL] Netherlands ........................ 8201481

[51] Int. Cl.[3] ........................ H02J 3/14; H04M 11/06

[52] U.S. Cl. ...................................... 307/40; 307/115; 340/310 A

[58] Field of Search ..................... 307/31, 35, 40, 115; 340/310 A

[56] References Cited

U.S. PATENT DOCUMENTS 4,131,882 12/1978 Hollabaugh et al. ........... 340/310 A 4,162,486 7/1979 Wyler .............................. 307/31 X 4,215,276 7/1980 Janeway ................................ 307/40

*Primary Examiner*—A. D. Pellinen

*Assistant Examiner*—Derek S. Jennings

*Attorney, Agent, or Firm*—Cushman, Darby and Cushman

[57] ABSTRACT

A system for supplying power to and switching a number of electrical appliances each having a power consuming part and a switching part, each switching part having a unique address. A signal line is coupled to each of the switching parts, to a clock pulse generator and to individual signal transmitters, each transmitter corresponding to one switching part, for generating a control signal for addressing its corresponding switching part. The signal transmitters, when activated, generate a characteristic control signal in synchronism with the clock pulses from the clock pulse generator. No central encoder is required for controlling the individual electrical appliances. Rather, it is necessary only to activate the particular signal transmitter associated with the particular appliance.

8 Claims, 4 Drawing Figures

SYSTEM FOR POWER SUPPLY TO AND SWITCHING OF A NUMBER OF ELECTRICAL APPLIANCES

BACKGROUND OF THE INVENTION

The invention relates to a system for power supply to and switching of a number of electrical appliances each of which is provided with a functional power-consuming part and a switching part, comprising power conductors that are connected on the one hand to a power source and on the other hand to the electrical appliances and a signal line comprising at least one conductor, which is connected on the one hand to signal transmitters and on the other hand to the switching parts of the electrical appliances, each signal transmitter corresponding with the switching part of one appliance or a group of associated appliances and, when activated, generating a control signal peculiar to the corresponding switching part, which is addressed to that switching part directly, and a clock pulse generator connected to the signal line.

The invention relates particularly to a system whereby a given electrical appliance may be switched from each outlet of the signal line and so connected to a power source such as the mains.

'Functional power-consuming part' may relate to any electrical appliance such as a lamp, an electric space heater, a fan, an alarm horn, a drive motor of apparatus in a factory, on board a vehicle, boat or aircraft, and so forth.

A system of this type is known from U.S. Pat. No. 4,215,276. In this known system the signal line comprises a first conductor which is connected to the clock pulse generator which supplies a clock pulse signal to all signal transmitters and all switching parts, and a second conductor, the signal conductor proper, which interconnects all signal transmitters and switching parts, and which carries the control signals from the signal transmitters to the switching parts. Each signal transmitter, when actuated, allows a string of pulses peculiar to the signal transmitter and the corresponding switching part in a characteristic pulse format to pass from the clock pulse conductor to the signal conductor. This pulse signal is received by all switching parts but only the switching part which responds to the particular signal is activated.

This known system has the disadvantage that it requires separate conductors for control signals and clock pulse signals, which forms an undesirable complication. The object of the present invention is to provide a system that does not have this disadvantage.

SUMMARY OF THE INVENTION

The system according to the invention is characterized in that the signal transmitters, the switching parts and the clock pulse generator are connected to one and the same conductor of the signal line, the signal transmitters being so embodied, as to generate when actuated, their characteristic control signal by modification of a given series of successive clock pulses. Consequently, the control signals and the clock pulses require only one common conductor. This offers substantial savings, particularly with more elaborate systems, in terms of materials, installation time and cable tray space.

The signal transmitters according to the present invention are preferably so embodied that the said control signal is brought about by extending up to the next clock pulse a number of clock pulses of the said series of successive clock pulses in a combination characterizing the control signal (the 'troughs' between certain successive clock pulses are 'filled'). This has the advantage that the exact signal shape is less important; in order to recognize a signal, the switching parts need only distinguish between 'high' and 'low' signals within fairly broad limits.

The signal transmitters and switching parts may be provided with an internal power supply unit with a rectifier and a chargeable part such as a capacitor or a small storage battery that may be charged from the signal line through the rectifier and may supply the electrical power to the switching part concerned or the transmitter. In this way it is not necessary to provide a separate low-voltage power supply line for the signal transmitters and switching parts or to feed each signal transmitter or switching part from the mains through its own transformer. It is emphasized tha the switching part and the functional power-consuming part of an electrical appliance need not be assembled in one unit. The switching part may, and in many instances will, be accommodated in its own housing separate from the power-consuming part.

BRIEF DESCRIPTION OF THE DRAWINGS

The invention is elucidated by the drawing by way of nonrestricting example.

The figures represent.

DESCRIPTION OF THE PREFERRED EMBODIMENT

Figure 1:
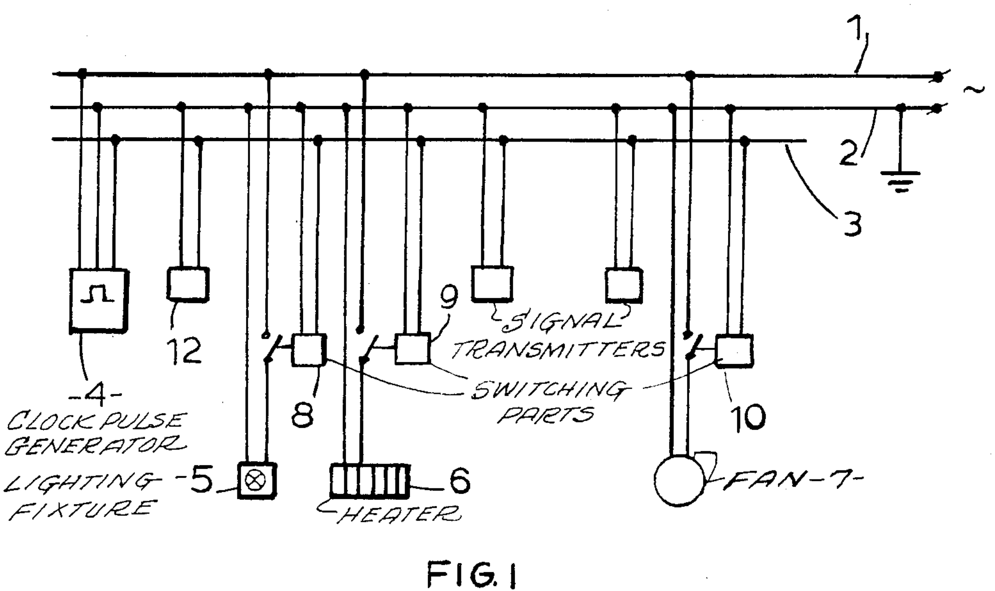
FIG. 1: A schematic overview of a system according to the invention with a number of electrical appliances connected.

In FIG. 1, lines 1 and 2 are the phase and neutral of an electrical installation in a building, for instance a dwelling. The electrical installation comprises also a signal conductor 3. To the installation is connected a clock pulse generator 4, which produces on signal conductor 3 a positive clock pulse signal with a frequency of, for instance, 1 kHz and an amplitude of, for instance, 5 Volts.

In FIG. 1 the signal line consists of a single conductor 3 and the clock signal is generated between the neutral line 2 and the signal line 3. Where local rules do not permit the use of the neutral line of the mains for the present purpose, the signal line consists of two conductors, namely the signal conductor proper 3 and a separate neutral conductor or ground conductor, across which two conductors the clock signal is generated.

To the electrical installation are connected a number of electrical appliances such as a lighting fixture 5, an electrical heater 6, a fan 7, and so forth. The appliances 5, 6 and 7 are switched on and off by switching parts 8, 9 and 10, respectively, which are controlled by control signals carried by signal conductor 3. The control signals are generated by signal transmitters 11, 12 and 13, signal transmitter 11, for instance, controlling switching part 8 associated with fixture 5; signal transmitter 12 controlling switching part 9 associated with heater 6; and signal transmitter 13 controlling switching part 10 associated with the fan 7. The signal transmitters 11 and 13 are actuated with, for instance, a manually operated pushbutton, and signal transmitter 12 (which controls the operation of the heater 6) with a room thermostat switch.

Figure 2:
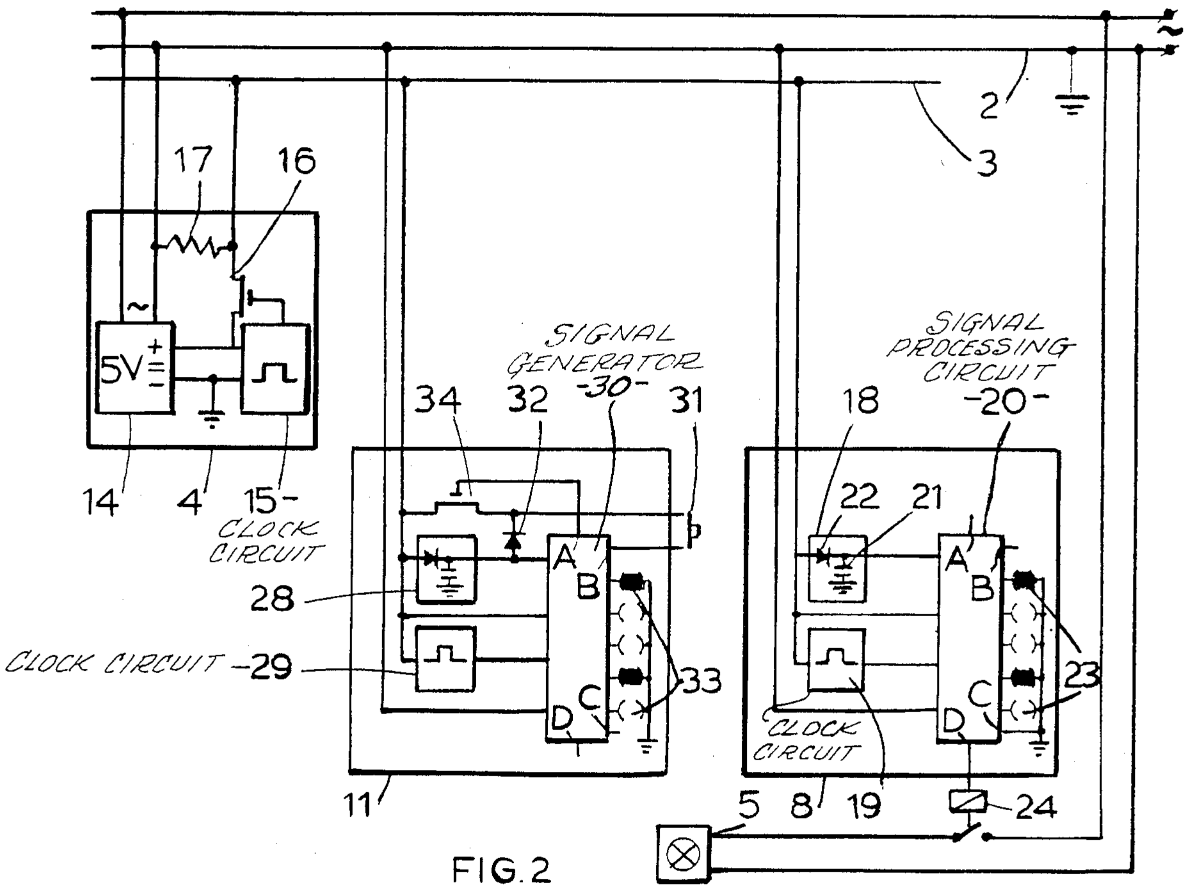
FIG. 2: A block diagram of the main components of an embodiment of the system according to the invention.

The block diagram FIG. 2 shows the make-up of the clock pulse generator 4, the switching part 8 and the signal transmitter 11 in more detail.

The clock pulse generator 4 is provided with a power supply 14 which is connected to the mains and which delivers 5 Volts DC at its outlet. A low-power clock circuit 15 delivers a pulse-shaped signal with a frequency of, for instance, 1 kHz with which an IGFET 16 is controlled so that the signal conductor 3 alternately assumes a voltage of +5 Volts and (via a resistor 17) the voltage of the neutral conductor 2. The parts are so dimensioned that the clock pulse generator 4 can deliver a clock pulse current of sufficient power for the power supply of the signal transmitters 11, 12 and 13 and the switching parts 8, 9 and 10 to be derived from it.

The switching part 8 is composed of an internal power supply unit 18, an internal clock circuit 19 and the signal processing part proper 20. The power supply unit 18, which delivers, for instance, 5 Volts DC to feed the switching part 8, consists essentially of a capacitor 21 which is charged from the signal conductor 3 via a diode 22. The internal clock circuit 19 delivers a clock pulse signal in synchronism with that from system clock generator 4 to the signal processing part 20 and remains in synchronism therewith for a sufficient number of cycles when the clock signal on the conductor 3 suffers interference from control signals. The address of the switching part 8 is determined by selective grounding of a number (in this case five) of address contacts 23 so that a binary address is formed with 'zeros' at the grounded contacts; in this particular case, the 1st and 4th contacts are grounded, and the binary address is 01101. If a signal with this address is generated on the signal conductor 3, the switching part 8 will energize a relay 24 to switch the fixture 5 on or off.

The signal transmitter 11 is provided with a same power supply unit 28 and internal clock circuit 29 as the parts 18 and 19 of the switching part 8. The signal generating part per se of the signal transmitter 11 is indicated as 30. The signal generating part 30 is provided with a same set of address contacts 33 to be grounded selectively as the contacts 23 of the signal processing part 20 of the switching part 8; obviously, the same address-determining contacts are grounded for an associated signal transmitter and switching part.

The signal generating part 30 is activated by depressing the pushbutton 31 so that an IGFET 34, which is connected to the power supply unit 28 via a diode 32 is controlled so that a control signal consisting of an extension of certain clock pulse signals is admitted to the signal conductor 3.

The parts 20 and 30 may be identical, the function being determined by the connections of the contacts; for use as a signal generating part 30 the contacts A and B are connected as indicated at signal transmitter 11, and the contacts C and D are not connected; for use as a signal processing part contact C is grounded and contact D connected to the relay 24, as indicated at switching part 8, and the contacts A and B are not connected.

The internal power supply unit (18 or 28), the internal clock circuit (19 or 29) and the signal processing or generating part (20 or 30) when mass-produced may be united to advantage in an integrated circuit. In that case, the function and address of an element are determined by the connections.

Figure 3:
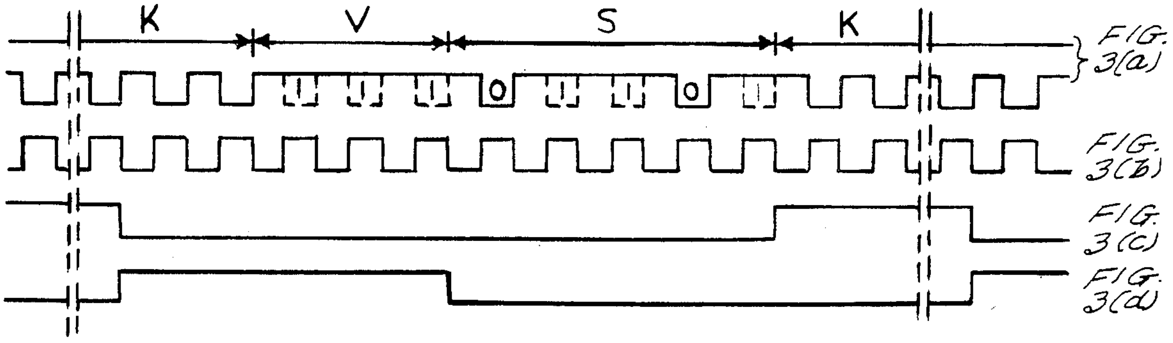
FIGS. 3(*a*)-3(*d*): An idealized timing diagram of the signals in a number of locations in the system.

An (idealized) timing diagram of the signals on signal conductor 3 when a control signal is present is shown in FIG. 3*a;* time runs from left to right. The parts K show the clock impulse signal without interference, which signal is generated by clock impulse generator 4. Each control signal starts with a fixed preamble V, 111 in binary signal notation, which means that three successive clock pulses are extended up to the next clock pulse. Then follows the specific address part S of the control signal; in the case shown 01101 in binary notation in accordance with FIG. 2.

The timing of the signal generated by the internal clock circuits such as 19 and 29 is shown in FIG. 3*b*. These signals are synchronous with, but shifted through half a cycle relative to, the clock pulse signal on signal conductor 3. Each time a signal pulse is present on the signal conductor 3 in the form of an extended clock pulse, the signal on the signal conductor 3 and the signal from the internal clock pulse generator comply with a logic 'and' condition so that these signals are suitable to control gate circuits.

Figure 4:
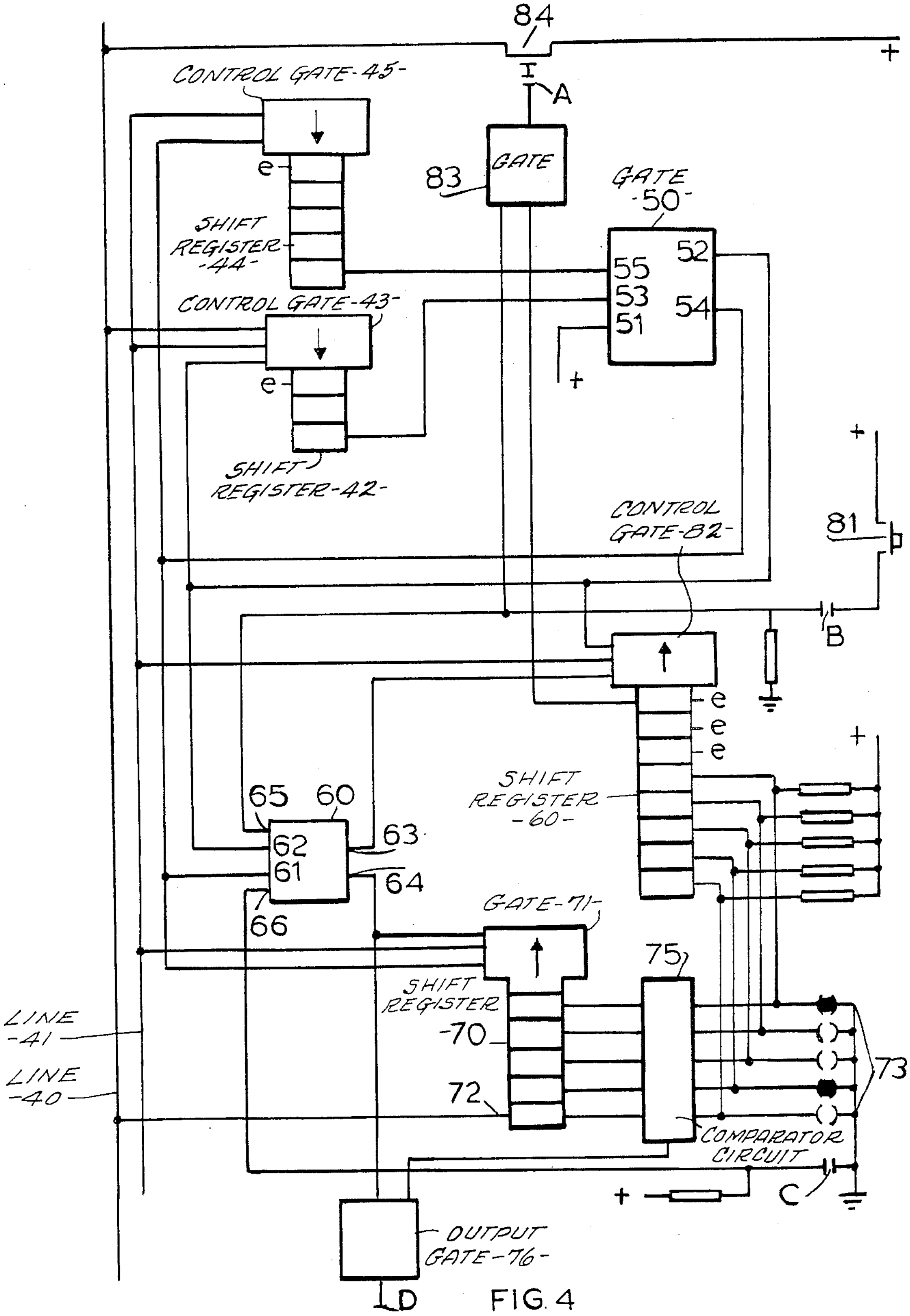
FIG. 4: A simplified diagram of a part of a signal transmitter or a switching part.

FIG. 4 shows a simplified diagram of a signal generating or processing part (30 or 20) in FIG. 2. The contacts A, B, C or D indicated in FIG. 2 are indicated herein also. First, the operation of a signal processing part, such as 20 in FIG. 2, of a controlled appliance will be discussed. In that case, the contacts A and B are not connected, contact C is grounded and contact D is connected with, for instance, a relay such as 24 in FIG. 2. Line 40 is connected to signal conductor 3, line 41 with the internal clock circuit (19 or 29). The connections of the several components to the internal power supply unit (18 or 28) are not shown for the purpose of convenience; only where a connection to the power supply serves also a signal function is this shown (with a + mark).

Two shift registers, 42 and 44, with control gates 43 and 45, respectively, and a gate circuit 50 provide in the timing of the signal processing part. If the internal power supply voltage (connected to input 51 of gate 50) is insufficient, then gate 50 produces at output 52 a 'wait' signal, which among other things is present at one of the inputs of control gate 43, which furthermore has inputs that are connected to signal line 40 and internal clock line 41. After some time, during which the internal clock circuit can be synchronized with the clock impulse signal on the signal line 40, the 'wait' signal is canceled and gate 50 produces a 'run' signal at output 54. At this moment, the circuit is ready to operate one time. The 'run' signal is present among other things at one of the inputs of control gate 45, a second input of which is connected to clock line 41. Directly the preamble of a control signal occurs on signal line 40, a 'one' (marked 'e' in the diagram) is shifted through the shift register 42 within three clock cycles (the duration of the preamble) and is supplied as input signal to input 53 of gate 50. Now, the 'run' signal will be disabled if a correct preamble is recognized. When this 'run' signal is disabled a 'one' is shifted through the shift register 44 within five clock cycles (the duration of the address portion of the control signal) and is supplied as input signal to input 55. As a result, the 'wait' signal occurs again at output 52, the shift registers 42 and 43 are reset, and the starting condition (no control signal) is restored. The timing diagrams of the 'wait' and 'run' signals are shown in FIGS. 3*c* and 3*d*, respectively. The 'run' signal and the 'wait' signal are also supplied to the inputs 61 and 62, respectively, of a gate circuit 60. Input 66 of gate 60 is grounded via contact C when the circuit described in FIG. 4 is a signal-processing part; this results in output 63 of gate 60 being disabled. Output 64 is connected with an input of the control gate 71 of a shift register 70; to this control gate are also supplied the 'run' signal and the signal of internal clock line 41. Input 72 of shift register 70 is connected to signal line 40. During the address recognition cycle the address portion of the signal from this input 72 is shifted into the shift register 70, a '1' being read in when an extended clock pulse on the signal line 40 coincides with an internal clock pulse on signal line 41, and an '0' when the clock pulse on signal line 40 is not extended.

The address in the shift register 70 is compared in a comparator circuit 75 with an address which, as already discussed at FIG. 2, is determined by selective grounding of a number of address contacts 73. If the address entered in shift register 70 corresponds with the address fixed by the contacts 73, then an output signal from comparator circuit 75 controls output gate 76, which then sends a control signal to a relay circuit such as 24 in FIG. 2 connected with a contact D. In this relay circuit use will usually be made of a solid state relay because of the low power that the circuit is capable of delivering. Such solid state relay may control an electromechanical relay.

If the circuit described in FIG. 4 functions as a signal generator (such as 30 in FIG. 2), the operation is as follows. Contacts C and D are not connected. The address determined by the contacts 73 is stored in a shift register 80; a '1' is stored in the three locations marked 'e', which correspond with the preamble of the control signal to be transmitted. The contact B is now connected to a pushbutton 81 (corresponding with 31 in FIG. 2); by depressing this pushbutton input 65 of gate circuit 60 is connected to the + of the internal power supply unit so that a signal is generated at the output 63 which signal is supplied to the control gate 82 of shift register 80.

Another input of the control gate 82 is connected to output 52 of gate circuit 50. If the 'wait' signal is absent here, that is, if the internal power supply voltage has the required value *and* there is not already on signal conductor 3 an address signal transmitted by a different controlling device, then, if the said signal occurs at output 63, the contents of the shift register 80 are shifted out of the register in eight steps and are supplied to an input of output gate 83 as a serial pulse signal. The output gate 83 is connected to contact A, which is now connected to the gate of an IGFET 84 (corresponding with 34 in FIG. 2), which is controlled by the output signal of gate 83 so that, as indicated in the discussion of FIG. 2, a control signal is supplied to signal conductor 3 via line 40.

In the above description it is assumed that it suffices for the specific portion of a control signal ('S' in FIG. 3) to contain only the address of the controlled appliance, because the control always contains only the transition from one of two possible switching states to the other (from 'on' to 'off' or from 'off' to 'on'); the practical contents of the control signal then invariably is 'switch over!' If a control signal is to be capable of ensuring a specific choice among two or more possibilities, it will be necessary either to address each switching possibility individually or to extend the signal with a command portion so that the signal consists of the combination preamble-address-command. Then, a choice between two switching states requires only one command bit, such as '1' for switch on and '0' for switch off. The system is also suitable for power limiting purposes; a maximum power switch then commands upon unauthorized increase of power consumption a signal transmitter to cut out a number of low-priority appliances. Also, the system may be provided with a signal control system to ensure that all appliances that may be switched off are switched off from one central location, for which purpose use may suitably be used of, for instance, an address consisting exclusively of 'zeros'. This and similar options should be deemed to form part of the invention.

The described system is meant primarily for controlling a relatively small number (for instance about thirty) of electrical appliances with a relatively low switching frequency such as may be expected of the electrical installation of a dwelling, an office, a small ship, a workshop, and so forth. In the then exceptional case of two appliances being operated within 3 clock cycles (the duration of the preamble), this is less than 0.01 second at a clock frequency of 1 kHz, there will be no recognizable address and the activation should be repeated.

We claim:

1. A system for supplying power to and switching electrical appliances each of which has a functional power-consuming part and a switching part, comprising: a power conductor connected to a power source and to the electrical appliances and a single signal conductor connected to signal transmitters and to the switching parts, each signal transmitter corresponding with the switching part of one appliance or a group of associated appliances and, when activiated, generating a control signal peculiar to the corresponding switching part, which addresses that switching part directly, and a clock pulse generator connected to the single signal conductor, the signal transmitters being arranged so as to generate, when activated, their characteristic control signal by modification of a given series of successive clock pulses from said clock pulse generator.

2. A system according to claim 1 wherein the signal transmitters are arranged so that each said control signal is a digital signal having first and second logic states and wherein the particular characteristic is determined by the logic states of the times of clock pulses.

3. A system according to claim 1 or 2 wherein the signal transmitters and the switching parts are each provided with an internal clock circuit means for generating a clock pulse signal which is synchronous with the clock pulses of the clock pulse generator connected to the signal line.

4. A system according to claim 3 wherein the internal clock circuit means includes means for generating a clock pulse signal which is synchronous with, and shifted through one half cycle relative to, the clock pulse signal of the clock pulse generator connected to the signal conductor.

5. A system according to either claim 1 or 2 wherein each of the signal transmitters and each of the switching parts is provided with signal part which is structured so as to be configurable by manipulation thereof either as a signal-generating part in a signal transmitter or as a signal-processing part in a switching part.

6. A system according to either claim 1 or 2 further including an internal power supply unit to be charged from the signal line and comprising a rectifier and a chargeable part, wherein the internal power supply unit, the internal clock circuit and the signal part are formed as a single integrated circuit.

7. A system for supplying power to and switching electrical appliances, each of which has a functional power-consuming part and a switching part, comprising:

a power conductor connected to a power source and to the power consuming part of each of said appliances;

a clock pulse generator for generating a clock pulse signal;

signal transmitters for generating control signals for addressing the switching parts of said appliances, each transmitter generating when activated, a characteristic control signal that is a predetermined function of the clock pulse signal;

a signal conductor connecting all of said transmitters and switching parts, each of the transmitters and switching parts including a signal part which is structured so as to be configureable by manipulation thereof either as a signal generating part in a transmitter or as a signal processing part in a switching part, each signal part including a time control part including:

a first gate circuit having "wait" and "run" signal outputs, a first shift register, connected to an input of said first gate, for disabling the "run" signal upon the occurrence of a predetermined preamble of a control signal on the signal conductor, a second shift register, connected to an input of said first gate circuit, for activating the "wait" signal upon cessation of an address portion of said signal, a third shift register, a second gate circuit, responsive to a disabling of said "run" signal, for generating an output signal for ensuring that said address portion is entered into said third shift register, a comparator for comparing the address in said third shift register with a fixed address and generating an output signal indicative thereof, a relay adapted to be activated by said comparator output signal indicating a positive comparison, a fourth shift register for storing a control signal having a preamble and said fixed address, coupled so as to be controlled by an output of said second gate circuit, and a switch for activating said second gate circuit for causing said fourth shift register to provide its contents to said signal conductor.

8. A system for supplying power to and switching electrical appliances each of which has a functional power-consuming part and a switching part, comprising:

a power conductor connected to a power source and to the power consuming part of each of said appliances;

a clock pulse generator for generating a clock pulse signal;

signal transmitters for generating control signals for addressing the switching parts of said appliances, each transmitter generating when activated, a characteristic control signal that is a predetermined function of the clock pulse signal, each control signal being a digital signal having first and second logic states and wherein the particular characteristic is determined by the logic states at the times of clock pulses, and a signal conductor connecting all of said transmitters and switching parts, each of the transmitters and switching parts including a signal part which is structured so as to be configureable by manipulation thereof either as a signal generating part in a transmitter or as a signal processing part in a switching part, each signal part including a time control part including:

a first gate circuit having "wait" and "run" signal outputs, a first shift register, connected to an input of said first gate, for disabling the "run" signal upon the occurrence of a predetermined preamble of a control signal on the signal conductor, a second shift register, connected to an input of said first gate circuit, for activating the "wait" signal upon cessation of an address portion of said signal, a third shift register, a second gate circuit, responsive to a disabling of said "run" signal, for generating an output signal for ensuring that said address portion is entered into said third shift register, a comparator for comparing the address in said third shift register with a fixed address and generating an output signal indicative thereof, a relay adapted to be activated by said comparator output signal indicating a positive comparison, a fourth shift register for storing a control signal having a preamble and said fixed address, coupled so as to be controlled by an output of said second gate circuit, and a switch for activating said second gate ciruct for causing said fourth shift register to provide its contents to said signal conductor.

* * * * *